United States Patent [19]

Dono et al.

[11] Patent Number: 4,896,948
[45] Date of Patent: Jan. 30, 1990

[54] SIMPLIFIED DOUBLE-CAVITY TUNABLE OPTICAL FILTER USING VOLTAGE-DEPENDENT REFRACTIVE INDEX

[75] Inventors: Nicholas R. Dono, Hopewell Junction; Paul E. Green, Jr., Mount Kisco, both of N.Y.; Philippe A. Perrier, Viroslay, France

[73] Assignee: International Business Machines Corporation, Armonk, N.Y.

[21] Appl. No.: 312,285

[22] Filed: Feb. 21, 1989

[51] Int. Cl.[4] .................. G02F 1/01; G02F 1/133; G01B 9/02
[52] U.S. Cl. ................. 350/355; 350/347 V; 350/163; 350/317; 356/352
[58] Field of Search ............... 350/347 V, 347 R, 355, 350/356, 358, 163, 312, 317; 356/346, 352

[56] References Cited

U.S. PATENT DOCUMENTS

| | | | |
|---|---|---|---|
| 3,612,655 | 10/1971 | Buchan et al. | 356/352 X |
| 4,225,236 | 9/1980 | Sandercock | 356/352 X |
| 4,247,166 | 1/1981 | Yeh | 356/352 X |
| 4,269,481 | 5/1981 | Yeh et al. | 350/356 |
| 4,553,816 | 11/1985 | Durand et al. | 356/352 X |
| 4,790,634 | 12/1988 | Miller et al. | 350/347 V |

Primary Examiner—Stanley D. Miller
Assistant Examiner—Napoleon Thantu
Attorney, Agent, or Firm—Douglas W. Cameron

[57] ABSTRACT

A tunable optical filter having a number cascaded resonator cavities with each cavity having electro-optic material in its interior. The resonator cavities will resonate at a select wavelength when the index of refraction of the electro-optic material is changed to a predetermined value in response to only a single control voltage. The index of refraction of the electro-optic material is adjusted to a predetermined value by application of the single control voltage to one of a pair of electrodes which are on opposite sides of the resonator cavities.

4 Claims, 2 Drawing Sheets

SIMPLIFIED DOUBLE-CAVITY TUNABLE OPTICAL FILTER USING VOLTAGE-DEPENDENT REFRACTIVE INDEX

DESCRIPTION

Technical Field

This invention relates to a multi-cavity tunable optical filter for use in lightwave communications, lasers and spectroscopy. More specifically, this invention discloses a simplfied multi-cavity optical filter having a means of varying simultaneously the index of refraction of electro-optic material in each of the cavities of the filter in response to a single control voltage.

DESCRIPTION OF THE PRIOR ART

The present invention relates to a means of discriminating between lightwave signals arriving at different wavelengths. Typical applications are in communications (where different information-bearing channels are at different wavelengths), tunable lasers (where a cavity external to the laser controls its emission wavelength), and in spectroscopy (where the details of spectrum of energy versus wavelength must be resolved). Fabry-Perot resonators (a pair of parallel mirrors with adjustable spacing) are widely used to perform this tunable narrowband filtering function. For all these applications, the key parameter in providing wavelength selectivity is the finesse of the cavity, which in turn is limited by how high the mirror reflectivity, planarity and paralleism can be made. The intensity transmission of the device as a function of frequency is a set of equally spaced teeth, and the finesse is defined as the ratio of spacing between the teeth, the free spectral range, to the half-maximum width of each tooth.

In improving the wavelength-discriminating ability of optical filters, i.e. in effecting an increase in the effective finesse, two approaches have been followed:

(1) improving the finesse of a single cavity filter by careful attention to the mirror properties just listed, and (2) passing the light through a cascaded sequence of several cavities, while insuring that only certain desired wavelengths all cavities resonate together while at most other wavelengths not all cavities pass the incident light with full strength. The effective finesse of the cascade is much higher than that of either cavity individually. The multi-cavity scheme, while effective and sometimes used, has a great disadvantage in flexibility, since the adjustments of the several cavities must be made independently. The present invention solves that problem by presenting a method for simply and economically controlling the several cavities simultaneously.

Single cavity Fabry-Perot filters have been widely described, for example, in the book by G. Hernandez, Fabry-Perot Interferometers, Cambridge Univ. Press, 1986, and the article by S. R. Mallinson, Wavelength-Selective Filters for Single-Mode Fiber WDM Systems Using Fabry-Perot Interferometers, Applied Optics, Vol. 26, 1987, pp. 430–436.

Multiple-cavity filters have been described too, for example, in in an article by J. E. Mack, D. P. McNutt, F. L. Roesler and R. Chabbal, The PEPSIOS Purely Interferometric High-Resolution Scanning Spectrometer, Applied Optics, Vol. 2, 1963, pp. 873–885; also J. E. Mack, D. P. McNutt and F. L. Roesler, Interferometric Spectrometer Utilizing Three Fabry-Perot Etalons In Series, U.S. Pat. No. 3,373,651, March 1968, and in A.A.M. Saleh and J. Stone, Two-Stage Fabry-Perot Filters As Demultiplexors In Optical FDMA LANs, IEEE Jour. of Lightwave Tech., Vol. 7, February 1989.

A special three mirror version of the two cavity filter has been described by S. J. Hogeveeen and H. van der Stadt, Fabry-Perot Interferometers With Three Mirrors, Applied Optics, Vol. 25 No. 22, pp. 4184–4186.

In the prior art, the two (or more) cavities are separate structures and usually require that two control voltages be manipulated separately, requiring two control servo loops, not just one. First, peak number n of Fabry-Perot Cavity I is tuned to and locked in on the desired wavelength, and then peak number m of Fabry-Perot Cavity II is tuned to and locked in on the same wavelength. When the system is returned to another frequency, two separate returnings are required. This sort of procedure is tolerable only in a research "optical bench" environment. The device to be described below embodies both cavities in a single rigid device, with a means of translating a single applied voltage into the proper optical path length x of one cavity and at the same time the proper optical path length y of the second cavity.

In the work of Saleh and Stone, the authors analyzed the improvement in overall wavelength spectral transfer function by using two cavities instead of one. In this work it was assumed that the cavities are controlled separately. They analyzed structures composed of two separate two-mirror cavities in cascade and a second "three-mirror" structure inwhich the right mirror of the left cavity and the left mirror of the right cavity are the same mirror. To prevent spurious resonance peaks (due to standing waves between the first and third mirrors), this three-mirror version relies on control of the reflectance of the three mirrors so that they obey a certain ratio to each other within a certain tolerance. In the conventional four-mirror version of a two-cavity filter, other means (such as slightly tipping the second cavity relative to the first, as discussed below) are used to suppress these reflections.

In the PEPSIOS device of Mack, et al. the tuning was not carried out by changing the spacing only or the index only, as with the present invention. In the PEPSIOS device tuning was done by changing gas pressure in all cavities in concert and by different amounts, thus changing the index in all cavities by different amounts. The use of variable gas pressure (not adjustable spacing) to get the desired change of resonant frequency was quite complex. Apparently the reason Mack, et al. had to do this was either that they did not think of using electro-optic materials for the purpose, or the materials available at the time were not good enough. At any rate, they used differential gas pressure in all three chambers (each containing one of the cascaded Fabry-Perot cavities) not only to scan the whole assembly in wavelength once the three cavities were tuned to coincidence, but to set the coincidence in the first place. An elaborate series of needle valves, etc. was used to make sure that the gas pressures in the three chambers were not the same, but changed by an appropriate amount.

The PEPSIOS device of Mack, et al. described above does suggest changing the resonant frequency of resonant cavities by changing the index of refraction of material inside the cavity, but it does not suggest changing index of refraction which is identical in a plurality of resonant cavities, simultaneously in response to only a single control voltage. Fabry-Perot Interferometer, by J. Sandercock (U.S. Pat. No. 4,225,236 dated November 1977) was apparently in search of the same kind of device we have devised: with one control voltage to be able to control two (or more) cavities simultaneously. However, the solution he came up with is very complex and massive—unlikely to be usable in a situation where simplicity, low cost and/or rapid retuning are required. The Sandercock apparatus consisted of a large horizontally translating optical stage, the horizontal position being controlled piezoelectrically. Light entered horizontally from the left and passed through Cavity I (spacing=x) whose left mirror was fixed and whose right mirror was positioned on the piezoelectrically movable optical stage. Off to the right of the stage was another mirror which reflected light back at an angle tipped upward from the horizontal by an angle $\theta$. The reflected light passed at angle $\theta$ through the right hand (movable) mirror of Cavity II (fastened to the stage), thence to the left (fixed) mirror of Cavity II and then out. To tune the device, the stage was moved, and as x changed, y changed by an amount proportional to $\cos \theta$. This device relied on moving mirrors to change the spacing and not on a change of index of refraction.

SUMMARY OF THE INVENTION

It is an object of this invention to provide a small, cost-effective and rapidly tunable optical filter required for tunable lasers and optical communications. Accordingly, this invention provides a tunable, optical filter which has a number of resonator cavities with each resonator cavity having reflective surfaces at two of its ends. This invention also provides a means for varying the index of refraction of electro-optic material inside each of the cavities of the filter in response to only a single control voltage. The resonator cavities then resonate at a selected wavelength when optical signals are passed through the cavities and the index of refraction of the electro-optic material is adjusted to a pedetermined value. This invention discloses a multiple-cavity tunable optical filter which uses a single control voltage to vary the tunings of the several cascaded cavities in step with one another so as to maximize wavelength selectivity. The ratio of the optical path lengths (x and y in a two-cavity arrangement) is set so that, as the resonance wavelength changes, it is always the case that $x/y = n/m$ where n and m are the number of half-waves standing in the two cavities, respectively. An apparatus for electrically tuning such a structure with a single control voltage is presented that uses voltage-dependent refractive index of the material inside the cavities whose spacings remain fixed.

BRIEF DESCRIPTION OF THE DRAWINGS

The accompanying drawings, together with the written descriptions, illustrate two complete embodiments of the invention. The first one is deemed the most promising, since it is the simplest to fabricate.

DESCRIPTION OF THE PREFERRED EMBODIMENT

It is a well-known idea that a cascade of two Fabry-Perot interferometers will have greater selectivity than each individually. If one cavity resonates at wavelength $\lambda$, it does so because its effective mirror spacing or optical path length is $x = n\lambda/2$. The effective mirror spacing is that actual spacing between the mirrors times the effective refractive index of the medium between the mirrors. Spectral peaks in the filter passband will be separated by the free spectral range $FSR_1 = c/2x = f/n$ where c is light velocity and f is the frequency. If, on the other hand, a second cavity is cascaded with the first so that the incident light has to traverse the first cavity and then the second cavity, and if the effective mirror spacing of the second cavity resonating with $\lambda$ is different from x, namely $y = m\lambda/2$, then its free spectral range is $FSR_1 = c/2y = f/m$. Thus the transmission of the first cavity has teeth spaced f/n apart and similarly f/m apart for the second cavity. By picking m and n to be integers close to each other, one can assure that full transmission through both cavities will occur for teeth that are far apart, thus creating a very high effective finesse. It can be shown that the overall FSR of the cascade is the least common multiple of the individual FSRs. Since the finesse of a single cavity is usually limited by manufacturing tolerances on mirror planarity, roughness and parallelism, the cascade approach is a powerful tool for building high-resolution devices from two or more devices of poorer quality.

Figure 1:
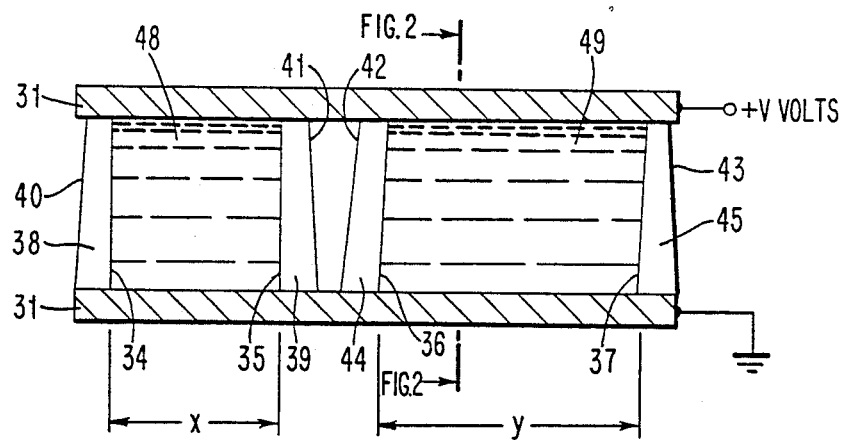
FIG. 1 shows a cross-section view of the tunable optical filter for the preferred embodiment of this invention. This view also shows two seprate cavities with reflective surfaces at each end thereof.
Figure 2:
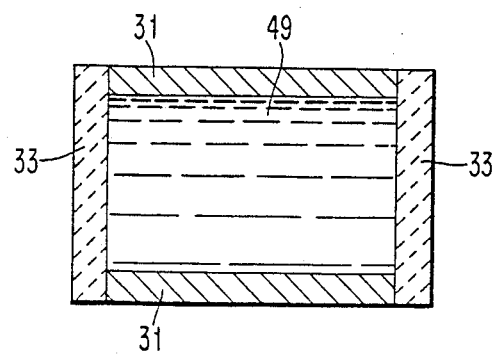
FIG. 2 shows a cross-section of the device of FIG. 1 taken at the dashed line of FIG. 1.

The preferred embodiment is shown in FIGS. 1 and 2 for the illustrative case of two cavities. Collimated light enters from the left in FIG. 1 passes through two successive cavities, and exits at the right. The cavity medium 32, identical in both cavities in some electro-optic material, one whose index is some function of voltage gradient (not necessarily a linear function). The device is tuned by changing the voltage applied between electrodes 31. The sides 33 of the cavity are formed from insulating material, and the top and bottom are the electrodes 31. The device has a uniform cross-section along its length, as shown in FIG. 2.

Resonant cavity 48 of optical length x is formed by the pair of reflective surfaces 34 and 35, respectively. Similarly, resonant cavity 49 of optical length y is formed by the pair of mirror surfaces 36 and 37, respectively. Mirror surfaces (also referred to as reflective surfaces) 34 and 35 are formed by appropriate coatings on two pieces of glass 38 and 39, respectively. Surfaces 40 and 41 are bevelled slightly to avoid parallelism with reflective surfaces 34 and 35, in accordance with current practice in order to prevent spurious cavity resonances. Similarly, surfaces 42 and 43 are made on nonparallel with reflective surfaces 36 and 37, respectively.

When the device is manufactured, the parallel facing reflective surfaces 34 and 35 forming cavity 48 are set at spacing x (equal to n times the half wavelength of some test $\lambda$). Similarly, cavity 48 is set at a spacing y (m times the same test $\lambda$).

Given the spacings above, the device operates as follows. When it is desired to tune to an arbitrary $\lambda$, the required single voltage is applied to the electrodes 31. When this voltage is applied to electrodes 31, the index of refraction of the electro-optic material in cavity 48 will be adjusted to a predetermined value so as to cause cavity 48 to resonate at the wavelength λ. Thus, there will will be n half waves of wavelength λ standing in the resonator cavity. If the material in resonator cavity 49 is identical to the material in cavity 48, then, since the index of refraction in cavity 49 will be at the same predetermined value, there must be m half-waves of wavlength λ standing in resonator cavity 49 as required.

Figure 3:
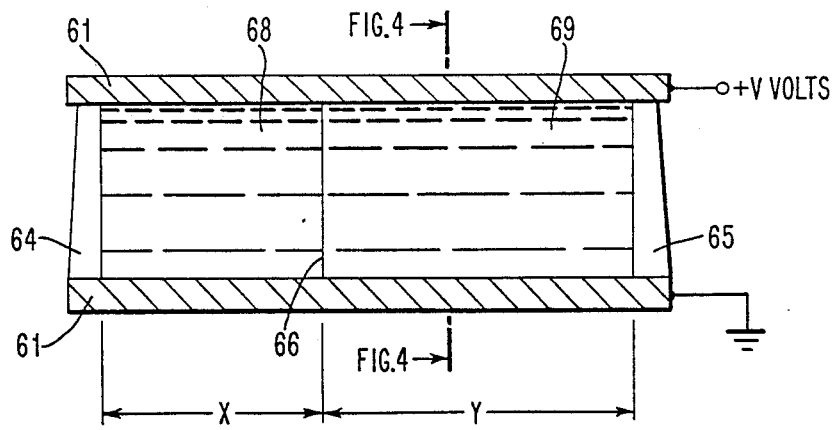
FIG. 3 shows the cross-section view of a similar index-tuned embodiment that uses not four mirrors, but three. However there are reflective surfaces at each end of each cavity.
Figure 4:
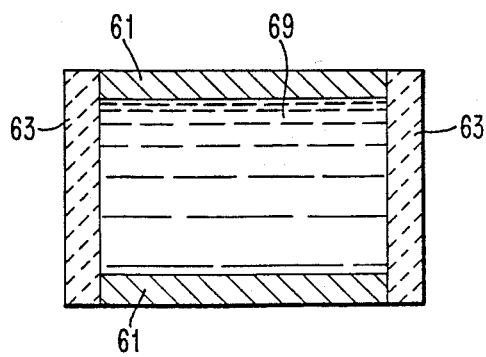
FIG. 4 shows a cross-section of the device of FIG. 3 taken at the dashed line of FIG. 3.

FIGS. 3 qnd 4 show a three-mirror double cavity tunable filter using index tuning. Mirror 66 is shown as a thin line in FIG. 3; in practice it could be a thin slab of glass with a reflective coating on one side and an antireflection coating on the other. The two resonator cavities are formed by mirrors 64 and 66 and by mirrors 66 and 65. The control voltage is applied across electrode 61 on the top of the resonator cavities 68 and 69 while the bottom electrode 61 is grounded. On two sides of the cavities 68 and 69 are the insulating walls 63. The intra-cavity electro-optic material is 62. The slight tipping of one cavity relative to the other that was required in the preferred embodiment of FIG. 1 is unnecessary with the three-mirror device, since secondary resonances are controlled by careful choice of mirror reflectance.

As an example of more detail on a potential two-cavity embodiment, one could make the following design choices. Wavelength=1.5 microns; integer n=100; free space $x = 50 \times 1.5 = 75$ microns; free spectral range of the first cavity at 1.5 microns $= 1.5^2/2x = 0.015$ microns; integer m=104; free space y=78 microns; free spectral range of the second cavity at $1.5\mu = 1.5^2/2y = 0.14423$ microns; effective total free spectral range $= 26 \times 0.014423 = 25 \times 0.015 = 0.375$ microns; K (lever arm factor)=100. Typical materials would include lithium niobate for the electro-optic material, a ceramic material for insulating sidewalls, and optical grade glass for the mirror structures. Typical values for voltage V would be zero to 500 volts.

The extension of the ideas presented in this application can be applied to more than two cavities and non planar mirror structure such as confocal mirrors. As another example, non-planar mirror structures (e.g., confocal mirrors) could clearly be used.

Having thus described our invention, what we claim as new and desire to secure by Letters Patents is:

1. A tunable optical filter, comprising:
    a plurality of resonator cavities, each of said resonator cavities having reflective surfaces at each of two ends of said cavities with an electro-optic material inside said each resonator cavity;
    a pair of electrodes at two opposite sides of said resonator cavities, with only a single control voltage being applied to one of said electrodes while the other of said electrodes is set at ground potential, the index of refraction of said electro-optic material in both of said cavities varying simultaneously with changes in said control voltage;
    said cavities resonating at a selected wavelength when optical signals are passed through said cavities and when the index of refraction of said electro-optic material is adjusted to a predetermined value.

2. A tunable optical filter as recited in claim 1, wherein said means for varying the index of refraction comprises:
    a pair of electrodes with one of said electrodes being approximately parallel to the other of said electrodes, said electrodes being at two opposite sides of said resonator cavities, with only a single voltage being applied to one of said electrodes while the other of said electrodes is set to ground potential.

3. A tunable optical filter as recited in claim 1, wherein said resonator cavities are cascaded with respect to each other with the cavities being arranged along a straight line and in between said electrodes.

4. A tunable optical filter, comprising:
    a pair of resonator cavities, each of said resonator cavities having reflective surfaces at each of two ends of said cavities with an electro-optic material inside of said each resonator cavity, with the lengths of said cavities being in the ratio of integers; and
    a pair of electrodes at two opposite sides of said resonator cavities, with only a single control voltage being applied to one of said electrodes while the other of said electrodes is set at ground potential, the index of refraction of said electro-optic material in both of said cavities varying simultaneously with changes in said control voltage;
    said resonator cavities resonating at a selected wavelength when optical signals are passed through said cavities and when the index of refraction of said electro-optic material is adjusted to a predetermined value said cavities being arranged along a straight line cascaded with respect to each other and in between said electrodes.

* * * * *